United States Patent [19]
Holmes et al.

[11] Patent Number: 5,237,504
[45] Date of Patent: Aug. 17, 1993

[54] METHOD OF AND APPARATUS FOR DETECTING MISFIRE

[75] Inventors: Michael Holmes; Benjamin J. Bradshaw, both of Solihull, England

[73] Assignee: Lucas Industries public limited company, Solihull, United Kingdom

[21] Appl. No.: 655,568

[22] Filed: Feb. 13, 1991

[30] Foreign Application Priority Data

Feb. 14, 1990 [GB] United Kingdom ............... 9003387
Sep. 28, 1990 [GB] United Kingdom ............... 9021225
Sep. 28, 1990 [GB] United Kingdom ............... 9021226

[51] Int. Cl.⁵ .................. G06F 15/00; G01P 3/00
[52] U.S. Cl. .................. 364/431.08; 364/431.04; 123/419; 123/436
[58] Field of Search .......... 364/431.08, 431.01, 364/431.03, 431.04, 431.07, 424.03, 565; 123/419, 436, 416, 417; 73/117.2, 117.3, 116

[56] References Cited

U.S. PATENT DOCUMENTS

| | | | |
|---|---|---|---|
| 4,532,592 | 7/1985 | Citron et al. | 364/431.05 |
| 4,532,798 | 8/1985 | Kohama et al. | 73/116 |
| 4,691,286 | 9/1987 | Obayashi et al. | 364/431.08 X |
| 4,893,600 | 1/1990 | Holmes | 123/419 |
| 4,930,479 | 6/1990 | Osawa et al. | 123/436 |
| 4,932,379 | 6/1990 | Tang et al. | 123/436 |
| 4,936,277 | 6/1990 | Deutsch et al. | 123/436 |
| 4,953,532 | 9/1990 | Nagano et al. | 123/419 |
| 5,016,591 | 5/1991 | Nanyoshi et al. | 123/419 |
| 5,021,960 | 6/1991 | Manako et al. | 364/431.01 |
| 5,035,220 | 7/1991 | Uchinami et al. | 123/436 |
| 5,069,183 | 12/1991 | Nagano et al. | 123/419 |

OTHER PUBLICATIONS

Proc. 38th IEEE Vehicular Technology Conference 237–244 (Dec. 1988), G. Rizzoni et al. "Fault Isolation and Analysis For IC Engine Onboard Diagnostics".

Primary Examiner—Thomas G. Black
Assistant Examiner—Thomas S. Auchterlonie
Attorney, Agent, or Firm—Jenner & Block

[57] ABSTRACT

In order to detect misfire in an internal combustion engine, engine speed is determined by measuring the time of passage of a crankshaft disc from a first position to a second position during every revolution. A detection circuit takes the reciprocal of the measured times of passage to form a series of engine speeds and forms the difference between consecutive engine speeds. These differences are compared with a threshold to signal a misfire when the threshold is exceeded.

6 Claims, 12 Drawing Sheets

| CYLINDER    | 1 | 2 | 3 | 4 | 5 | 6 | 7 | 8 | 9 | 10 | 11 |
|-------------|---|---|---|---|---|---|---|---|---|----|----|
| ALGORITHM 1 | + |   |   | − |   |   |   |   |   |    |    |
| ALGORITHM 2 | + |   |   |   |   |   | − |   |   |    |    |
| ALGORITHM 3 | + |   |   |   |   |   |   |   |   | −  |    |

ETC.

FIG. 11.

| CYLINDER    | 1 | 2 | 3 | 4 | 5 | 6 | 7 | 8 | 9 | 10 | 11 |
|-------------|---|---|---|---|---|---|---|---|---|----|----|
| ALGORITHM 1 | + |   | − |   |   |   |   |   |   |    |    |
| ALGORITHM 2 | + |   |   |   | − |   |   |   |   |    |    |
| ALGORITHM 3 | + |   |   |   |   |   | − |   |   |    |    |

ETC.

FIG. 12.

| CYLINDER    | 1 | 2 | 3 | 4 | 5 | 6 | 7 | 8 | 9 | 10 | 11 |
|-------------|---|---|---|---|---|---|---|---|---|----|----|
| ALGORITHM 1 | + |   | − | − |   | + |   |   |   |    |    |
| ALGORITHM 2 | + | − |   |   | − | + |   |   |   |    |    |

ETC.

FIG. 13.

| CYLINDER | 1 | 2 | 3 | 4 | 5 | 6 | 7 | 8 |
|---|---|---|---|---|---|---|---|---|
| ALGORITHM | − |  | + | + |  | − |  |  |

FIG. 14.

| CYLINDER | 1 | 2 | 3 | 4 | 5 | 6 |
|---|---|---|---|---|---|---|
| ALGORITHM | − | + | + | − |  |  |

FIG. 15

| CYLINDER | 1 | 2 | 3 | 4 | 5 | 6 | 7 | 8 | 9 | 10 | 11 | 12 | 13 |
|---|---|---|---|---|---|---|---|---|---|---|---|---|---|
| ALGORITHM | − |  |  | + | + |  |  | − |  |  |  |  |  |

FIG. 16.

| THRESHOLD | DETECTIONS | CYLINDER NUMBER | | | | | |
|---|---|---|---|---|---|---|---|
| | | 0 | 1 | 2 | 3 | 4 | 5 |
| 5 | 1194 | 0 | 0 | 0 | 500 | 500 | 194 |
| 6 | 1134 | 0 | 0 | 0 | 500 | 500 | 134 |
| 7 | 1077 | 0 | 0 | 0 | 500 | 500 | 77 |
| 8 | 1045 | 0 | 0 | 0 | 500 | 500 | 45 |
| 9 | 1024 | 0 | 0 | 0 | 500 | 500 | 24 |
| 10 | 1016 | 0 | 0 | 0 | 500 | 500 | 16 |
| 11 | 1005 | 0 | 0 | 0 | 500 | 500 | 5 |
| 12 | 1000 | 0 | 0 | 0 | 500 | 500 | 0 |
| 13 | 1000 | 0 | 0 | 0 | 500 | 500 | 0 |
| 14 | 1000 | 0 | 0 | 0 | 500 | 500 | 0 |
| 15 | 1000 | 0 | 0 | 0 | 500 | 500 | 0 |
| 16 | 1000 | 0 | 0 | 0 | 500 | 500 | 0 |
| 17 | 1000 | 0 | 0 | 0 | 500 | 500 | 0 |
| 18 | 1000 | 0 | 0 | 0 | 500 | 500 | 0 |
| 19 | 1000 | 0 | 0 | 0 | 500 | 500 | 0 |
| 20 | 1000 | 0 | 0 | 0 | 500 | 500 | 0 |

FIG. 18.

| THRESHOLD | DETECTIONS | CYLINDER NUMBER | | | | | |
|---|---|---|---|---|---|---|---|
| | | 0 | 1 | 2 | 3 | 4 | 5 |
| 5 | 694 | 0 | 0 | 0 | 500 | 194 | 0 |
| 6 | 634 | 0 | 0 | 0 | 500 | 134 | 0 |
| 7 | 577 | 0 | 0 | 0 | 500 | 77 | 0 |
| 8 | 545 | 0 | 0 | 0 | 500 | 45 | 0 |
| 9 | 524 | 0 | 0 | 0 | 500 | 24 | 0 |
| 10 | 516 | 0 | 0 | 0 | 500 | 16 | 0 |
| 11 | 505 | 0 | 0 | 0 | 500 | 5 | 0 |
| 12 | 500 | 0 | 0 | 0 | 500 | 0 | 0 |
| 13 | 500 | 0 | 0 | 0 | 500 | 0 | 0 |
| 14 | 500 | 0 | 0 | 0 | 500 | 0 | 0 |
| 15 | 500 | 0 | 0 | 0 | 500 | 0 | 0 |
| 16 | 500 | 0 | 0 | 0 | 500 | 0 | 0 |
| 17 | 500 | 0 | 0 | 0 | 500 | 0 | 0 |
| 18 | 500 | 0 | 0 | 0 | 500 | 0 | 0 |
| 19 | 500 | 0 | 0 | 0 | 500 | 0 | 0 |
| 20 | 500 | 0 | 0 | 0 | 500 | 0 | 0 |

FIG. 19.

METHOD OF AND APPARATUS FOR DETECTING MISFIRE

The present invention relates to a method of and an apparatus for detecting misfire in an internal combustion engine.

It is generally considered that it is difficult to detect misfires reliably in internal combustion engines. Misfire detection can be based on variations in engine output speed and, in a known arrangement, this is determined by means of a variable reluctance transducer or the like co-operating with a toothed wheel mounted on the output shaft. A timer arrangement determines the time taken for consecutive teeth to pass the transducer and this time period, or its reciprocal representing speed, is used to detect variations in engine speed. However, the teeth of the toothed wheel are machined to certain tolerances and the resulting variations in time of passage of consecutive teeth can result in spurious detection of speed variations which create errors in detecting misfire.

Some internal combustion engines create cyclical rotary vibrations in their crankshaft which again affect the measurement of time periods between passage of consecutive teeth past the transducer. Such vibrations can occur at multiplies of half the firing frequency of the engine and again can lead to erroneous detection of misfire.

The output speed of internal combustions for driving vehicles is not, of course, constant, but varies with the speed of the vehicle. Also, movement of a vehicle over rough and uneven surfaces can feed back speed variations to the engine output shaft. Thus, the engine output shaft is subjected to linear accelerations and decelerations and varying changes in speed during normal driving of the vehicle and this can lead to erroneous detection of misfire.

According to a first aspect of the present invention, there is provided an apparatus for detecting misfire in an internal combustion engine, comprising means for making measurements representing engine speeds between the same points of cylinder and piston cycles of the engine, means for determining variations as the differences between measurements, and a comparator for comparing the variations with a threshold level and for signalling a misfire when the threshold level is exceeded.

According to a second aspect of the invention, there is provided a method of detecting misfire in an internal combustion engine, comprising the steps of making measurements representing engine speeds between the same points of cylinder and piston cycles of the engine, determining variations as the differences between measurements, comparing the variations with a threshold level, and signalling a misfire when the threshold level is exceeded.

Thus, it has been found that engine misfire can be detected on the basis of measurements representing engine speeds in a simple way and with a high degree of reliability. By making the measurements at the same points in different cylinder and piston cycles, for instance at top dead center between the compression and ignition strokes of each piston, speed variations caused by the inertia and geometry of the moving parts of an engine do not mask any engine speed variations caused by a misfire. In particular, engine speed variations caused by the inertia and geometry are substantially the same at the same points in different piston and cylinder cycles and are thus removed or their effects greatly reduced in the process of determining the engine speed variations, for instance by forming the differences between consecutive pairs of engine speed measurements. Preferably, misfire is detected on the basis of engine speed measurements, as opposed to period measurements (e.g. by taking the reciprocal of period measurements). It has been found that misfires can be detected throughout the whole range of engine speeds using threshold values which are constant or change little with engine speed.

The threshold level may be a fixed threshold. In one experiment with a typical six cylinder four-stroke cycle engine, a fixed threshold corresponding to a speed variation of 15 RPM has proved satisfactory. It is thus possible to use a fixed speed variation threshold throughout the full range of engine speeds, thus simplifying the processing required to detect misfires.

In the case where engine speed is measured by measuring the time of passage of reference points on a cyclically moving part of the engine past a sensor and taking the reciprocal of the measured time as the engine speed, preferably the same reference points are used for each engine speed measurement at the series of sampling points. This avoids any variation in measured engine speed caused by variation in the relative positions of the reference points. For instance, it is common practice to provide a toothed wheel on an engine crankshaft co-operating with a sensor, such as a variable reluctance transducer, to detect the passage of the teeth. Tolerances in the width and spacing of the teeth give rise to variations in the measured engine speed. By basing the engine speed measurement on the passage of a particular tooth or group of teeth past the sensor, for instance the same tooth or group of teeth for each rotation of a plane crankshaft of a four-stroke cycle in-line engine, measured speed variations caused by such tolerances are substantially eliminated or at least reduced to the level where they do not interfere with reliable detection of engine speed variations caused by misfires.

Alternatively or additionally, a compensating technique may be used whereby the average differences between period measurements for consecutive cylinders are used to establish correction factors which are applied to the instantaneous measurements.

A first embodiment of the invention provides an apparatus for detecting misfire in a multi-cylinder internal combustion engine, comprising: means for measuring the periods or speeds between first points and second points of cylinder and piston cycles of the engine; comparing means for comparing the xth, $(x+1)$th, $(x+a)$th, and $(x+a+1)$th periods or speeds to produce a comparison value, where a is the number of combustion events per period of a systematic measurement fluctuation or a multiple thereof and the xth and $(x+a)$th periods or speeds are of opposite polarity or sign and the $(x+1)$th and $(x+a+1)$th periods or speeds are of opposite polarity or sign in the comparison; and a comparator for comparing the comparison value with a threshold value to detect the occurrence of a misfire.

The parameter a may, for instance, be made equal to the number of combustion events per revolution of an output shaft of the engine or a multiple thereof. Thus, systematic errors resulting, for instance, from a timing or measuring device driven by the output shaft can be reduced or eliminated.

The comparison means may form the comparison value as $T(x)-T(x+1)-T(x+a)+T(x+a+1)$, where $T(i)$ is the ith period or speed.

The measuring means may comprise a variable reluctance transducer co-operating with a toothed wheel driven by the engine output shaft.

The threshold value may be a fixed value or may vary, for instance as a function of engine speed and engine load.

A second embodiment of the invention provides a method of detecting misfire in a multi-cylinder internal combustion engine, comprising measuring the speeds or periods between first points and second points of cylinder and piston cycles of the engine; comparing the xth, $(x+1)$th, $(x+a)$th, and $(x+a+1)$th periods or speeds to produce a comparison value, where a is the number of combustion events per period of a systematic measurement fluctuation or a multiple thereof and the xth and $(x+a)$th periods or speeds are of opposite polarity or sign and the $(x+1)$th and $(x+a+1)$th periods or speeds are of opposite polarity or sign in the comparison; and comparing the comparison value with a threshold value to detect the occurrence of a misfire.

The method may be performed for each cylinder and piston of a multi-cylinder engine by making speed measurements between respective series of the same cycle points for each cylinder and piston. For instance, engine speed may be measured between the same point in the cycle of each of the cylinders and pistons, for instance at or after top dead center of the firing stroke for each piston, with the speed variations being determined for each series of points corresponding to each cylinder and piston. This not only allows misfire to be detected for each cylinder and piston but also allows identification of a misfiring cylinder and piston to be indicated. It is therefore possible to provide diagnostic information which may be used: by an engine management system in order to take corrective action; to warn a vehicle driver of a possible fault; and to assist service personnel in identifying and rectifying a fault. A history of engine misfires may be stored, for instance to facilitate subsequent evaluation by service personnel in order to diagnose faults in the engine.

The method may be performed by and the apparatus embodied as a digital system, for instance a micro-controller including a programmed microprocessor, and may be provided as part of an engine management system. For instance, a crankshaft position/speed sensor may be connected via an interface circuit to a timer input terminal of a microcontroller. Thus, misfire detection can be provided within an existing engine management system merely by augmenting the controlling software so as to perform the method. In such cases, the requirement for additional processing power is relatively small so that misfire detection can be provided at very small or no additional cost to an engine management system.

It is thus possible to provide reliable misfire detection in an internal combustion engine of a vehicle and appropriate action can be taken when misfire is detected. This in turn makes it possible to reduce the emission of the pollutants, such as unburned or partially burned hydrocarbons, which in turn allows stringent pollution limits to be met with reduced degradation or "poisoning" of exhaust catalysts for removing certain combustion products.

A third embodiment of the invention provides an apparatus for detecting misfire in an n cylinder internal combustion engine, where n is greater than 1, the apparatus comprising: means for measuring the periods or speeds between first points and second points of cylinder and piston cycles of the engine; calculating means for forming a time or speed value T as the difference between sums $(T(x)+T(x+n-1))$ and $(T(y)+T(z))$, where $T(x)$ is the xth one of the periods or speeds, $T(x+n-1)$ is the $(x+n-1)$th one of the periods or speeds, and $T(y)$ and $T(z)$ are periods or speeds between the xth and $(x+n-1)$th one of the periods or speeds; and a comparator for comparing the time or speed value T with a threshold level to detect the occurrence of misfire.

This technique can be used with engines having even numbers of cylinders. It is believed that the technique can be used with engines having odd numbers of cylinders.

The periods or speeds $T(y)$ and $T(z)$ are preferably mid-way between the xth and $(x+n-1)$th periods or speeds. For instance, in the case of a four-stroke cycle engine having an even number of cylinders, the periods or speeds $T(y)$ and $T(z)$ are preferably the $(x+(n/2)-1)$th and $(x+(n/2))$th periods or speeds. In the case of a four-stroke cycle engine having an odd number of cylinders, the period or speed $T(y)$ may be the $(x+((n-1)/2))$th period or speed and the period or speed $T(z)$ may be the $(x+((n-1)/2)-1)$th period or speed, the $(x+((n-1)/2))$th period or speed, or the $(x+((n-1)/2)+1)$th period or speed i.e. the preceding, same, or succeeding period or speed.

A fourth embodiment of the invention provides an apparatus for detecting misfire in an n cylinder internal combustion engine, where n is greater than 1, the apparatus comprising means for measuring the periods or speeds between first points and second points of cylinder and piston cycles of the engine; comparing means for comparing periods or speeds to form a comparison value in accordance with at least two of the following constraints:

(i) Periods or speeds are compared as pairs with the periods or speeds of each pair being measured over the same range of positions of an output shaft of the engine;

(ii) Each xth period or speed is compared with the $(x+p)$th period or speed, where p is an even integer;

(iii) At least three periods or speeds are compared including an xth period or speed and an $(x+n-1)$th period or speed; and a comparator for comparing the comparison value with a threshold level to detect the occurrence of misfire.

It is thus possible to provide an apparatus for detecting engine misfire with greater reliability and less susceptibility to engine output shaft speed variations caused by tooth spacing errors or tolerances in a toothed timing disc, crankshaft vibrations at integer multiples of half the engine firing frequency, and linear accelerations and decelerations lasting at least one engine cycle.

Although the apparatus may be used with a toothed wheel and transducer, such as a variable reluctance transducer, as the period or speed measuring means, any other suitable means may be provided, and tolerances in manufacture of such means are likewise compensated for.

For convenience, the first and second points of each cylinder and piston cycle of the engine may be located at or near top dead center of the piston between its compression and ignition strokes. In general, the first and second points will occur after this top dead center position during the ignition stroke of the piston.

The threshold level used by the comparator may be a fixed threshold level. Alternatively, the threshold level may vary with engine parameters, such as engine speed and load demand.

A fifth embodiment of the invention provides a method of detecting misfire in an n cylinder internal combustion engine, where n is greater than 1, the method comprising measuring the periods or speeds between first points and second points of cylinder and piston cycles of the engine; calculating a time or speed value T as the difference between sums $(T(x)+T(x+n-1))$ and $(T(y)+T(z))$, where $T(x)$ is the xth one of the periods or speeds, $T(x+N-1)$ is the $(x+n-1)$th one of the periods or speeds, and $T(y)$ and $T(z)$ are periods or speeds between the xth and $(x+n-1)$th one of the periods or speeds; and comparing the time value T with a threshold level to detect the occurrence of misfire.

A sixth embodiment of the invention provides a method of detecting misfire in an n cylinder internal combustion engine, where n is greater than 1, the method comprising measuring the periods or speeds between first points and second points of cylinder and piston cycles of the engine; comparing periods to form a comparison value in accordance with at least two of the following constraints:

(i) comparing periods or speeds as pairs with the periods or speeds of each pair being measured over the same range of positions of an output shaft of the engine;
(ii) Comparing each xth period or speed with the $(x+p)$th period or speed, where p is an even integer;
(iii) Comparing at least three periods or speeds including an xth period or speed and an $(x+n-1)$th period or speed; and
comparing the comparison value with a threshold level to detect the occurrence of misfire.

A seventh embodiment of the invention provides an apparatus for identifying a misfiring cylinder of a multi-cylinder internal combustion engine, comprising means for detecting pairs of misfires corresponding to at least two consecutive engine combustion events, and means for identifying the cylinder in which the first of the consecutive combustion events took place.

An eighth embodiment of the invention provides a method of identifying a misfiring cylinder of a multi-cylinder internal combustion engine, comprising detecting misfires corresponding to at least two consecutive engine combustion events, and identifying the cylinder in which the first of the consecutive combustion events took place.

The detection of misfires may be provided by apparatuses and methods according to the third to sixth embodiments of the invention, or by any other suitable means for detecting misfire.

It has been found that a misfire of a single combustion event tends to cause a fluctuation in engine speed such that consecutive misfires are detected corresponding to an actual single misfire. Thus, each succeeding misfire is a "phantom" and misfiring actually took place during the first combustion event which gave rise to misfire detection. A single misfire can give rise to pairs, triplets, or larger groups of consecutive misfire detections depending, for instance, on the type of misfire detection being used. This can be ascertained by testing. In the case where a single misfire causes a pair of consecutive detections, should two consecutive misfires actually occur, three consecutive misfire events are generally detected so that, by dealing with each consecutive pair of misfires independently, the first and second combustion events are identified as having given rise to the triplet of misfire detections. Similarly, larger consecutive groups of misfires can be analyzed to identify the actual misfiring cylinders.

The invention will be further described, by way of example, with reference to the accompanying drawings, in which.

Figures 1, 2:
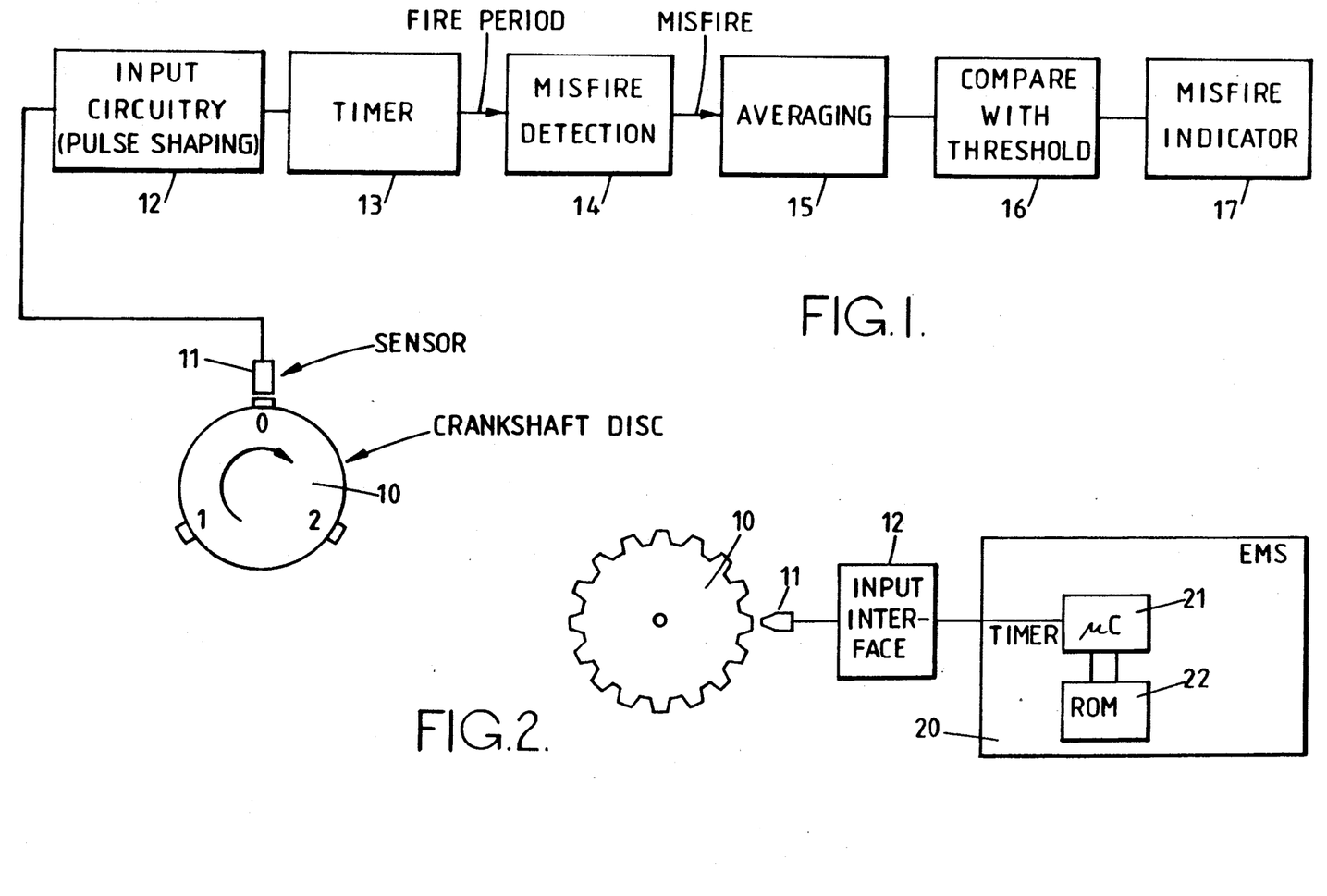
FIG. 1 is a block schematic diagram of a misfire detector constituting an embodiment of the invention.
FIG. 2 is a block schematic diagram of a micro-controller implementation of the detector of FIG. 1.

The misfire detector illustrated in the accompanying drawings forms part of an engine control system of a four-stroke cycle six cylinder spark ignition automotive internal combustion engine. The engine (not shown) has a crankshaft to which is fixed a disc 10. The disc has a toothed circumference and co-operates with a sensor 11, for instance a variable reluctance transducer, so as to provide a pulsed electrical signal with each pulse corresponding to the passage of a tooth past the sensor. In FIG. 1, only three teeth, labelled 0, 1, and 2, are shown such that each of these three teeth passes the sensor 11 when two of the pistons of the engine are at top dead center.

The output of the sensor 11 is connected to an input circuit 12 which includes pulse shaping circuitry for converting the analog sensor signal into a digital output signal. The digital output signal is supplied to a timer 13 which times the passage of one or a plurality of teeth past the sensor 11. For instance, as indicated in FIG. 1, the fire period corresponding to 120° rotation of the crankshaft following detection of each of the three teeth is measured by the timer 13 and supplied to a misfire detection circuit 14. The misfire detection circuit 14 forms the reciprocal of each fire period so as to provide an indication of engine speed during each ignition stroke of the engine and allocates the speed measurements consecutively to three series of measurements corresponding to measurement periods defined by passage of the three teeth of the disc 10 shown in FIG. 1 past the sensor 11. The detection circuit 14 is arranged to form the differences between consecutive pairs of speed measurements in each series.

The three sets of speed differences are supplied to a comparator within the detection circuit 14 which compares each speed difference with a fixed threshold, for instance corresponding to a variation of 15 RPM. Whenever a speed difference exceeds the threshold, the comparator supplies a signal to an averaging engine 15. The detection of a misfire can readily be correlated with the cylinder which is undergoing an ignition stroke so that, if desired, the misfiring cylinder and piston can be identified.

The averaging engine 15 acts as a low pass filter whose purpose is to avoid unwanted misfire indication in conditions where misfire is not present for long enough to cause substantial damage to the catalyst or unacceptably high levels of undesirable exhaust emissions. The output of the averaging circuit gives an indication of the percentage of misfire and is connected to a comparator 16. The comparator 16 compares the percentage of misfire with a fixed threshold, for instance representing 5% of misfire, corresponding to the level above which damage to the catalyst and/or excessive hydrocarbons emissions could occur. When the threshold is exceeded, the comparator 16 supplies a signal to a misfire indicator 17 which provides a visible and/or audible indication.

Although the misfire detector shown in FIG. 1 can be implemented as an analogue circuit, a discrete hard wired digital circuit, or a combination of the two, it is preferably implemented as a programmed micro-controller-based system as shown in FIG. 2. The sensor 11 is connected to an input circuit 12 whose output is connected to an engine management system 20 which controls ignition timing and fuelling of the internal combustion engine. The engine management system 20 includes a micro-controller 21 whose operation is controlled by a program stored in a read-only memory 22. The micro-controller 21 has a timer input TIMER to which the output of the input circuit 12 is connected. The micro-controller 21 performs an interrupt request routine in response to the leading edge of each pulse produced by the sensor 11 and processed by the input circuit 12 as a tooth of the disc 10 begins to pass the sensor 11.

Figure 3:
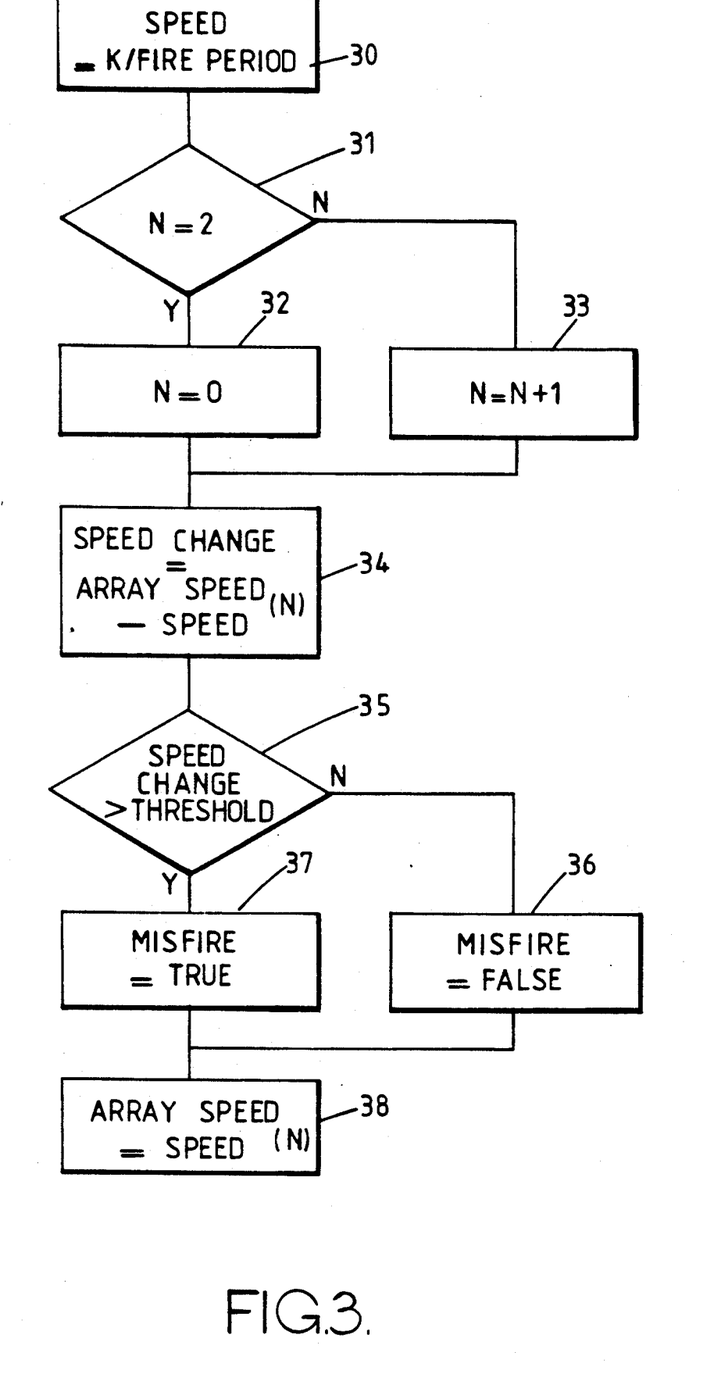
FIG. 3 is a flow diagram illustrating part of the operation of the micro-controller implementation of FIG. 2.

Part of the interrupt routine of the micro-controller 21 is illustrated by the flow diagram of FIG. 3 and corresponds to the misfire detection circuit 14. The other detection circuit functions performed by software are not illustrated in the drawings as they can readily be provided by a person skilled in the art.

At the end of the timed period of passage of the tooth or plurality of teeth past the sensor, the timed fire period is converted into engine speed by dividing a constant K by the fire period in a step 30. A decision step 31 then determines which of the teeth 0, 1, 2 triggered the fire period determination which has just been completed by ascribing a number N to passages of these three teeth past the sensor 11. If N is equal to two, the value of N is reset to zero in a step 32. If N is not equal to 2, then the value of N is incremented by 1 in a step 33.

A speed change is then determined by subtracting the speed determined in the step 30 from the previously stored value of the speed for the tooth N in a step 34. A step 35 determines whether the speed change is greater than a threshold, for instance corresponding to a speed variation of 15 RPM. If the speed change is less than the threshold, a misfire flag is set to false in a step 36. If the speed change exceeds the threshold, the misfire flag is set to true in a step 37. The stored speed for the tooth N is then up-dated at 38 by replacing the previous value with the value calculated in the step 30. The interrupt routine is then terminated and control passes to the other software resident in read-only memory 22.

Figure 4:
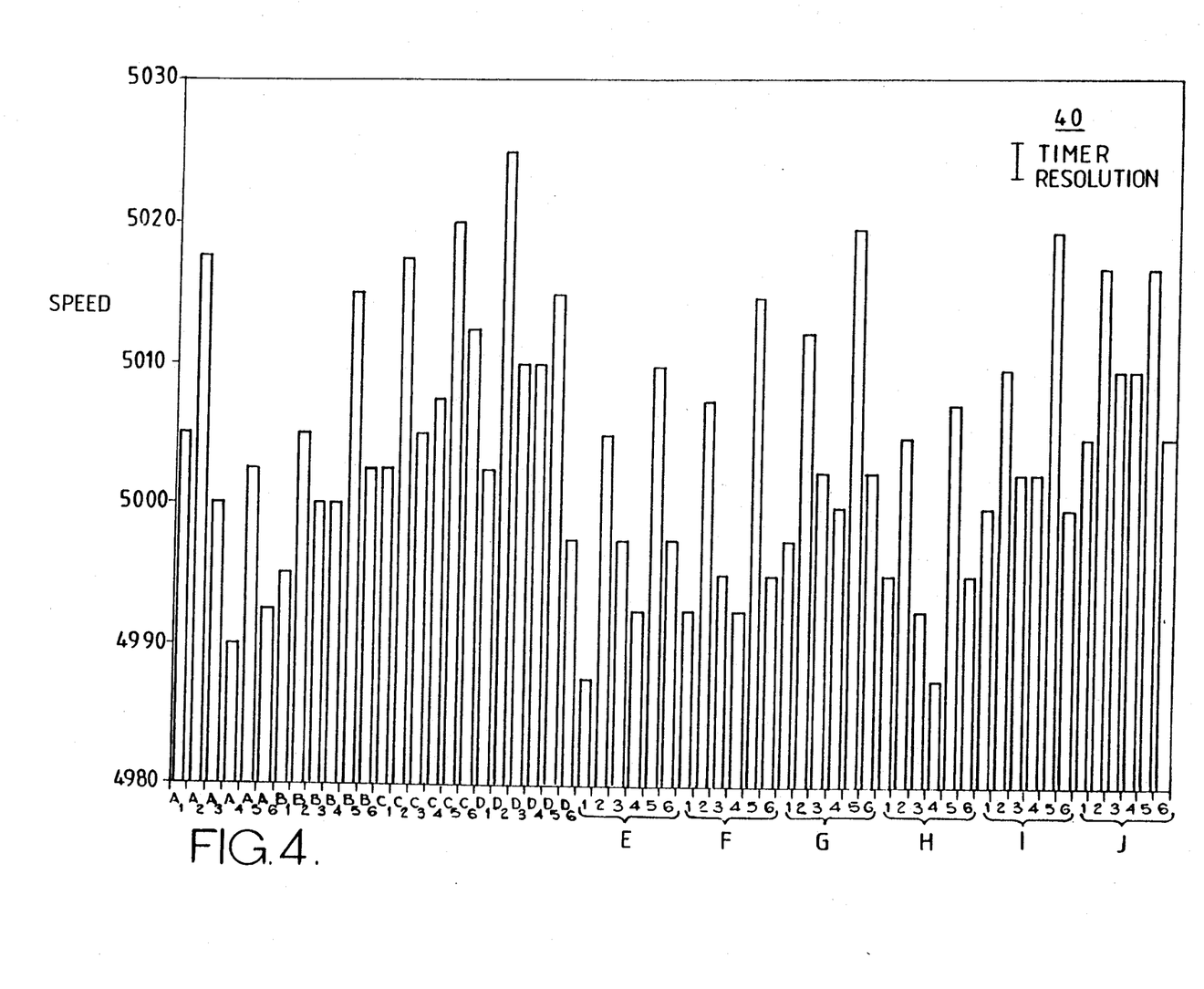
FIG. 4 is a graph illustrating cylinder speed variations as a series of speed measurements against time.

FIG. 4 shows a graph of engine speed against time with each ignition stroke being indicated on the time axis. In particular, each complete cycle of the engine is represented by a letter A, B, C... and each cylinder ignition stroke is indicated by a subscript in the order of firing of the cylinders. Thus, A represents the ignition stroke of the first piston in engine cycle A, $A_2$ represents the ignition stroke of the second cylinder in engine cycle A, etc., $B_1$ represents the first ignition stroke in engine cycle B, and so on. The timer resolution which, in turn, defines the speed measurement resolution, is indicated at 40. The graph in FIG. 4 thus shows individual cylinder speed variations for the engine under low load conditions and at an engine speed of 5,000 RPM. An engine misfire is deliberately introduced at the rate of one misfire for twenty ignition strokes so as to illustrate the effect on engine speed.

As can be seen from FIG. 4, consecutive engine speed measurements illustrate considerable variations in engine speed caused mainly by differences in tooth spacing on the disc 10. However, by considering the speeds as three interleaved series of engine speeds, the speed variations between consecutive ignition strokes in each series, i.e. every third measurement in FIG. 4, are greatly reduced in the absence of a misfire.

Misfires take place at strokes $A_4$, $D_6$, and $H_2$. A substantial drop in engine speed therefore occurs between strokes $A_1$ and $A_4$, between strokes $D_3$ and $D_6$, and between strokes $G_5$ and $H_2$ corresponding to the misfires and these speed variations can readily be detected despite the normal speed variations which are occurring as illustrated in FIG. 4.

It has been found that, surrounding a misfire in one cylinder, the adjacent strokes are also affected. This is because of the discrete sampling nature of the period measurements and because the speed remains low for several fires following a misfire. During these fires, a speed drop will still be registered compared with the cylinder three fires before.

Figure 5:
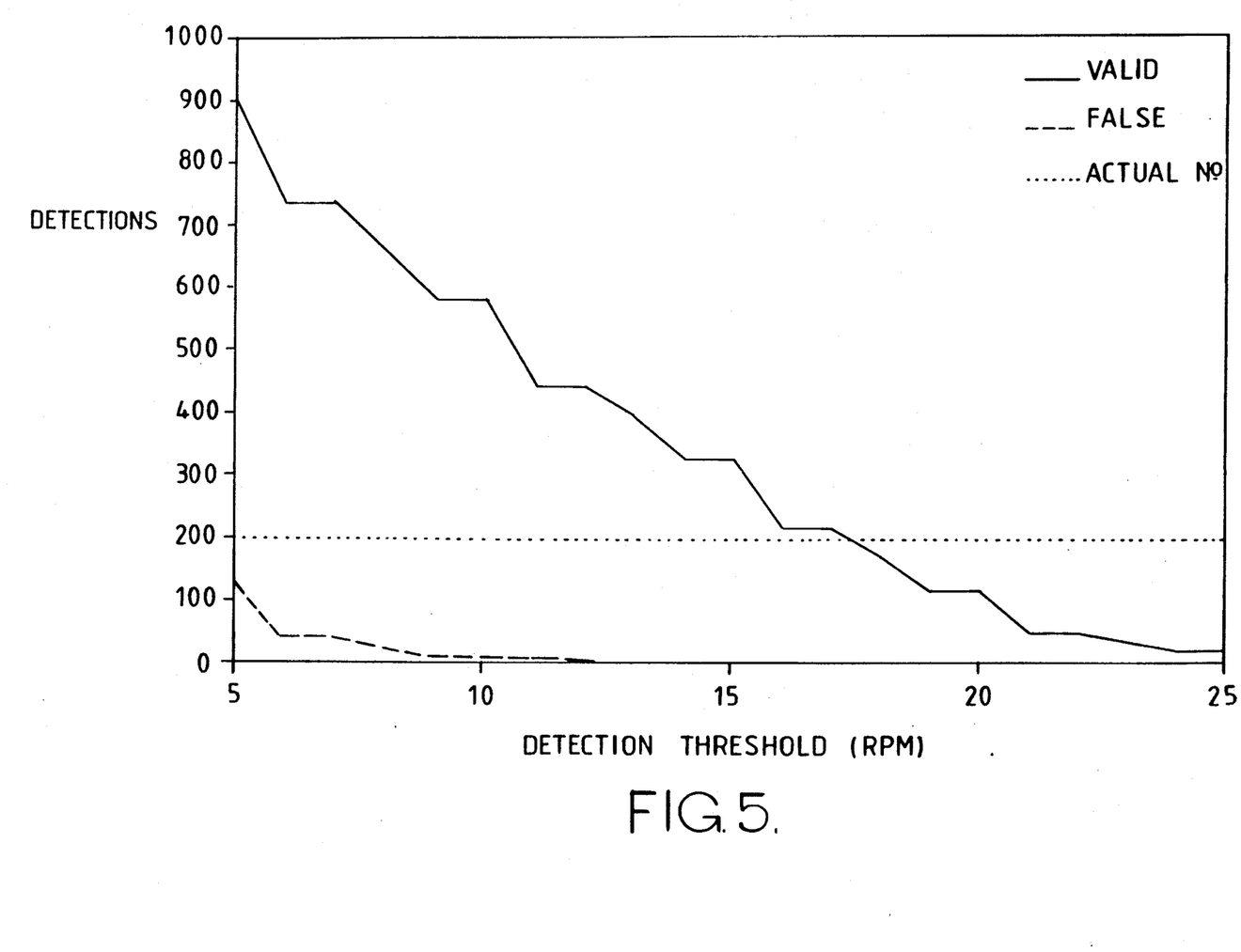
FIG. 5 is a graph of misfire detections against detection threshold for an engine speed of 5,000 RPM.

FIG. 5 illustrates misfire detection with the engine running in the same operating conditions and at the same rate of misfires as in FIG. 4. The curves represent numbers of detections of misfires over a period of engine operation when 200 misfires actually took place, as indicated by the chain dot line in FIG. 5.

The full line representing "valid" misfire detections illustrates how the number of detected misfires is related to the actual value of the threshold against which comparison of engine speed variations is made. The broken line representing "false" misfire detections was obtained under the same test conditions but without any misfire being generated. If the detection threshold is set to too high a value, for instance 25 RPM, the number of detected misfires is far too small, of the order of 20 to 30 misfire detections when in fact 200 misfires took place. The comparison is therefore too insensitive and misses approximately 90% of the actual misfires which occurred during the measurement period.

Conversely, if the detection threshold is set to a relatively low value, such as 5 RPM, the detector indicates false misfires. The comparison is therefore too sensitive and relatively small speed variations which occur naturally during engine operation have been falsely detected as misfires. Also, the tendency for engine speed remaining low during ignition strokes following a misfire is resulting in several misfires being detected when in fact only one misfire has occurred. These extra detections are not in fact erroneous but represent "second order" effects of the misfire.

Figure 6:
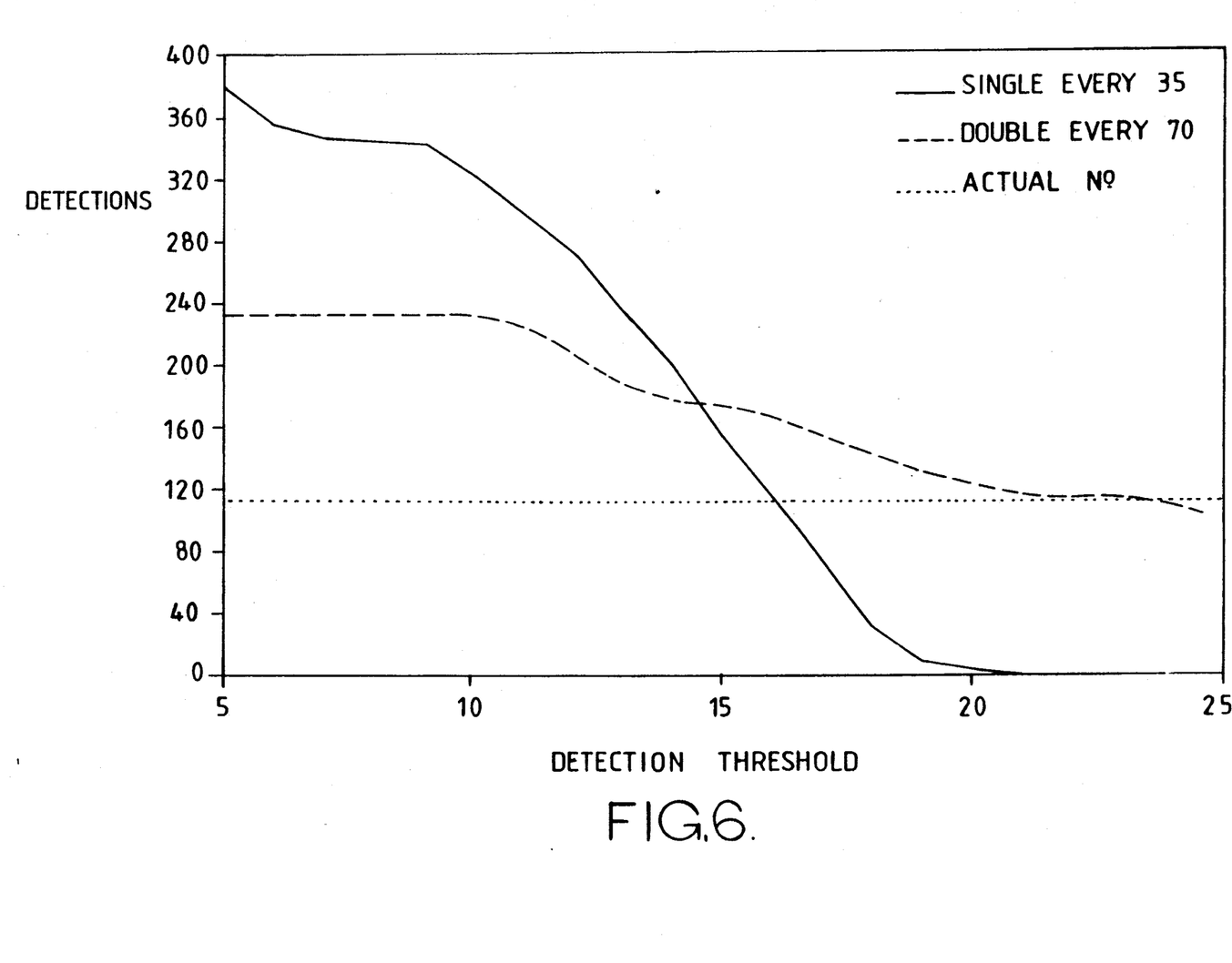
FIG. 6 is a graph similar to that of FIG. 5 for an engine speed of 3,000 RPM.

In the case of the engine whose operation is illustrated in FIG. 6, a detection threshold of between 15 and 20 RPM is appropriate and, in fact, a detection threshold of 15 RPM allows misfire to be detected with very good reliability and consistency, the curve of false detection in FIG. 5 indicating that, with this threshold, false misfire detections are non-existent.

FIG. 6 is similar to FIG. 5 but illustrates the effect of varying the detection threshold for the engine operating under low load at a speed of 3,000 RPM. Again, the actual number of misfires which occurred during the measurement period is indicated by the chain dot line. Engine operation with a single misfire every 35 ignition strokes is illustrated by the full line and operation with two consecutive misfires occurring every 70 ignition strokes is illustrated by the broken line. The curve representing single misfires is similar to the "valid" curve of FIG. 5 and indicates that a threshold of 15 RPM gives reliable and consistent detection of misfires. The curve representing double misfires gives approximately the same detection of misfires for this threshold.

As compared with FIG. 5, no false detections occur in the operating conditions illustrated in FIG. 6. This is to be expected because of the greater background speed variation which occurs at the higher engine speed of the operating conditions illustrated in FIG. 5.

In an alternative embodiment, the operation of the misfire detector shown in FIGS. 1 and 2 differs from that described hereinbefore as follows. The misfire detection circuit 14 forms the reciprocal of each fire period so as to provide an indication of engine speed during each ignition stroke of the engine and forms a speed change signal as $T(x) - T(x+1) - T(x+a) + T(x+a+1)$, where a is the number of engine fires per revolution of the crankshaft.

The speed change or difference signal is supplied to the comparator within the detection circuit 14 which compares each speed difference with a fixed threshold, for instance corresponding to a variation of 20 RPM. Whenever a speed difference exceeds the threshold, the comparator supplies a signal to the averaging engine 15.

Figure 7:
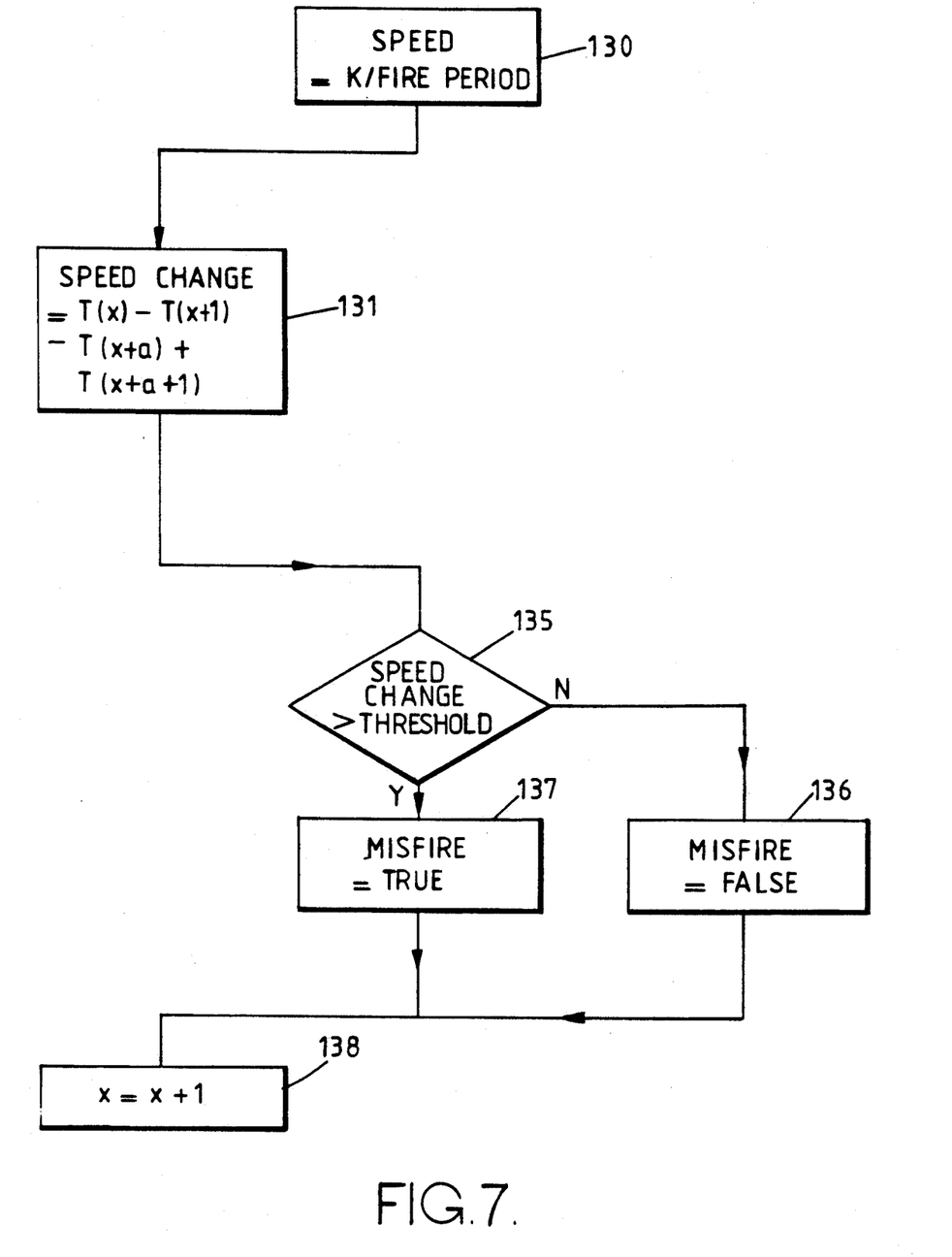
FIG. 7 is a flow diagram illustrating an alternative type of operation of the micro-controller implementation of FIG. 2.

As shown in FIG. 7, at the end of the timed period of passage of the tooth or plurality of teeth past the sensor, the timed fire period is converted into engine speed by dividing a constant K by the fire period in a step 130. A speed change is then determined in a step 131 as $T(x) - T(x+1) - T(x+a) + T(x+a+1)$, where a is the number of engine fires per revolution of the crankshaft. A step 135 determines whether the speed change is greater than a threshold, for instance corresponding to a speed variation of 20 RPM. If the speed change is less than the threshold, a misfire flag is set to false in a step 136. If the speed change exceeds the threshold, the misfire flag is set to true in a step 137. The index x is then up-dated in a step 138. The interrupt routine is then terminated and control passes to the other software resident in the read-only memory 22.

Figures 8, 9:
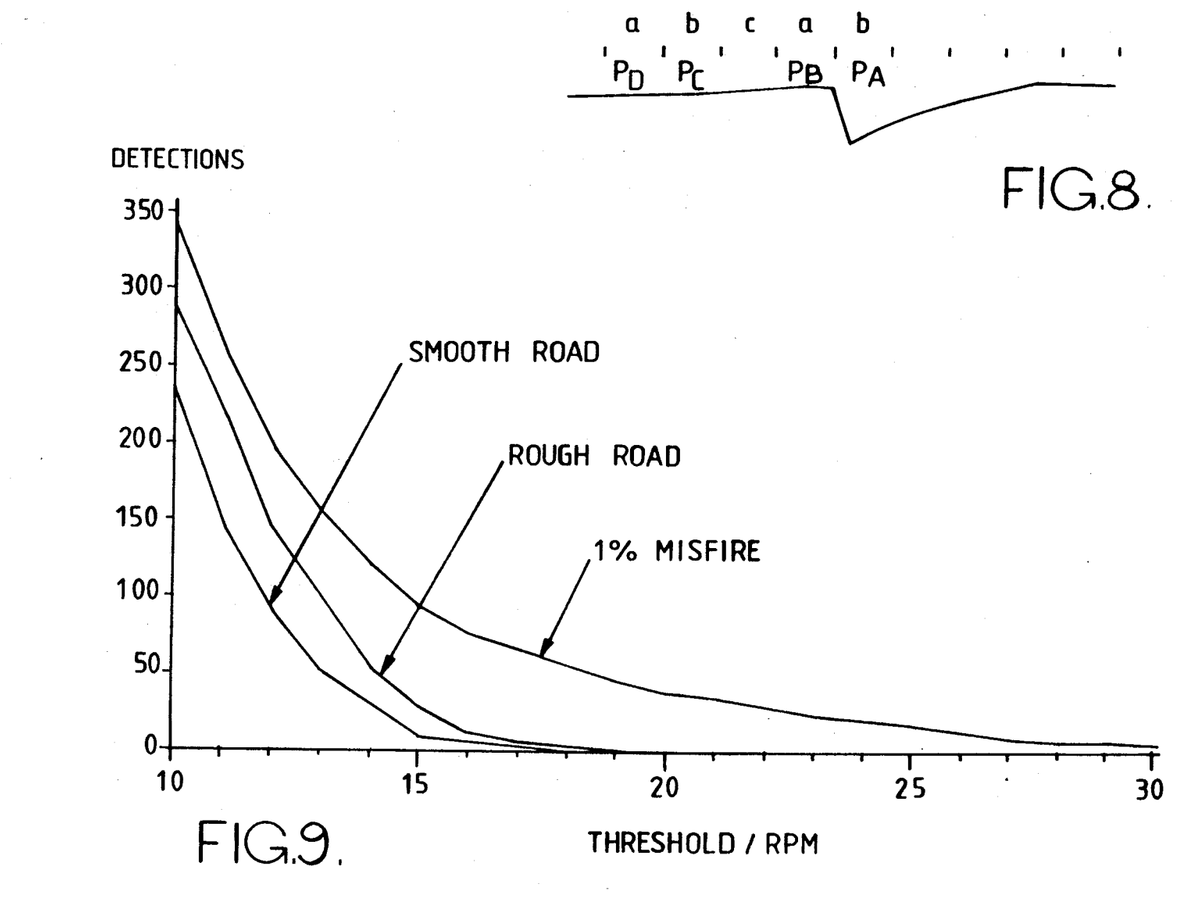
FIG. 8 is a graph illustrating a misfire detection technique used in the operation illustrated in FIG. 7.
FIG. 9 is a graph of misfire detections against detection threshold for an engine speed of 2,000 RPM.

FIG. 8 illustrates the algorithm performed in the step 131 in FIG. 7. The upper row represents the crankshaft segments a, b, c used for providing period measurement information and corresponding to sections of the circumference of the crankshaft disc 10 beginning with the teeth 0, 1, 2 shown in FIG. 1. The next row indicates the measured periods of passage of these sections as $P_A$ to $P_D$, and the bottom row represents a smoothed curve of engine output speed illustrating a misfire occurring during the period $P_A$. Thus, $P_A$ corresponds to $T(x)$, $P_B$ corresponds to $T(x+1)$, Pc corresponds to $T(x+a)$, and $P_D$ corresponds to $T(x+a+1)$ for a six cylinder four-stroke engine.

In order to provide effective identification of a misfiring cylinder, adjacent measured periods may be compared. This is because of the sharp drop in speed and slow speed recovery occurring after a misfire, as illustrated in the bottom row of FIG. 8. Comparing period measurements spaced apart by several fire cycles of the engine could result in spurious misfire detection, but comparison of adjacent periods allows identification of the misfiring cylinder.

However, the use of adjacent periods for comparison purposes results in the addition of errors caused by tolerances in manufacture of the teeth of the crankshaft disc 10. Such tolerances result in uneven tooth spacing and this can lead to spurious misfire detection.

The algorithm used in the step 131 of FIG. 7 and described above avoids these problems. In particular, comparisons are made between adjacent measured periods in order to detect the sharp drop in engine speed following a misfire but so as not to cause spurious detections. The same sections of the crankshaft disc 10 contribute positive and negative amounts in the algorithm so that any unevenness caused by tolerances in manufacture and the like cancel out from the measurement.

A further advantage of this algorithm is that errors due to linear acceleration and deceleration are also cancelled and greatly reduced.

FIG. 9 illustrates the number of misfire detections against the threshold in revolutions per minute (RPM) for the step 135 in FIG. 7. For this test, an engine was operated at 2,000 RPM and the number of detections in 3,000 engine fire cycles was accessed for different thresholds. The curves labelled smooth road and rough road show the erroneous or spurious detection of misfires at relatively low threshold levels whereas the curve labelled 1% misfire represents 30 actual misfires Below a threshold of 19 RPM, spurious misfire detection caused by feedback from the road surface can occur. Approximately the correct number of misfire detections were made with a threshold in the region of 20 RPM, and this would therefore seem suitable for the particular engine under test.

In a further embodiment of the invention, the operation of the misfire detector shown in FIGS. 1 and 2 differs from that described hereinbefore as follows. After each fire period, the misfire detection circuit 14 forms the sum of the engine speeds corresponding to the fire period just determined and the fire period five firing cycles of the engine earlier and subtracts from this the sum of the speeds corresponding to the firing periods two and three firing cycles of the engine earlier. This calculation provides a speed variation signal which is compared within the detector 14 with a threshold value, for instance corresponding to speed variation of 18 RPM. Whenever the speed difference exceeds this threshold, the comparator supplies a signal to an averaging engine 15. The detection of a misfire can readily be correlated with the cylinder which has just produced a combustion event so that a misfiring cylinder and piston can be identified. For consecutive misfire detections, cylinder identification can be performed as will be described hereinafter.

Figure 10:
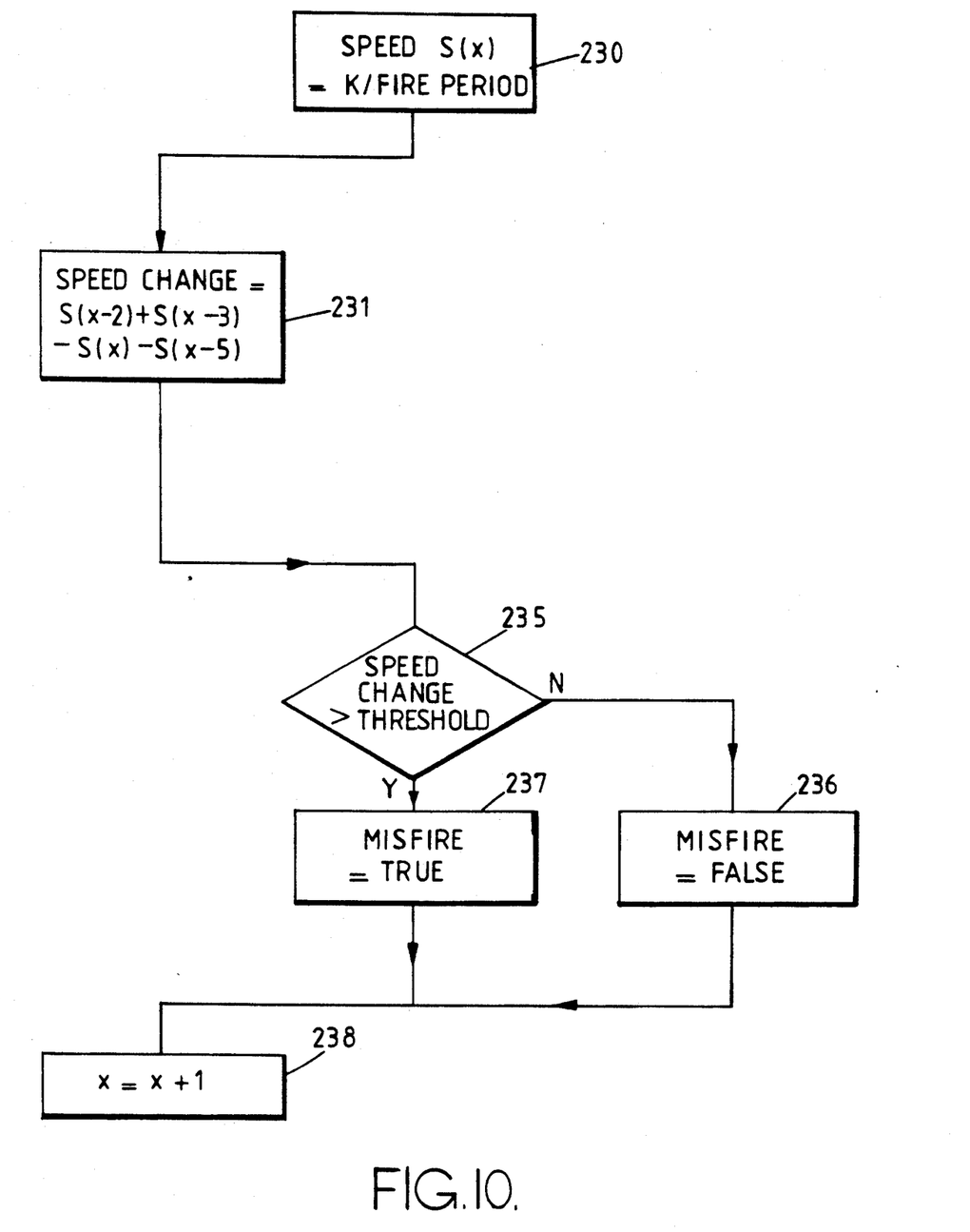
FIG. 10 is a flow diagram illustrating a further alternative type of operation of the micro-controller implementation of FIG. 2.

As shown in FIG. 10, at the end of the timed period of passage of the tooth or plurality of teeth past the sensor, the timed fire period is converted into engine speed by dividing a constant K by the fire period in a step 230. A speed change is determined as $S(x-2)+S(x-3)-S(x)-S(x-5)$ in a step 231, the speeds $S(x-2)$, $S(x-3)$, and $S(x-5)$ having been obtained in the step 230 during the second, third, and fifth preceding cycles of operation.

A step 235 determines whether the speed change is greater than a threshold, for instance corresponding to a speed variation of 18 RPM. If the speed change is less than the threshold, a misfire flag is set to false in a step 236. If the speed change exceeds the threshold, the misfire flag is set to true in a step 237. Finally, a step 238 resets the index x in readiness for a succeeding cycle of operation. The interrupt routine is then terminated and control passes to the other software resident in the read-only memory 22.

Figure 11:
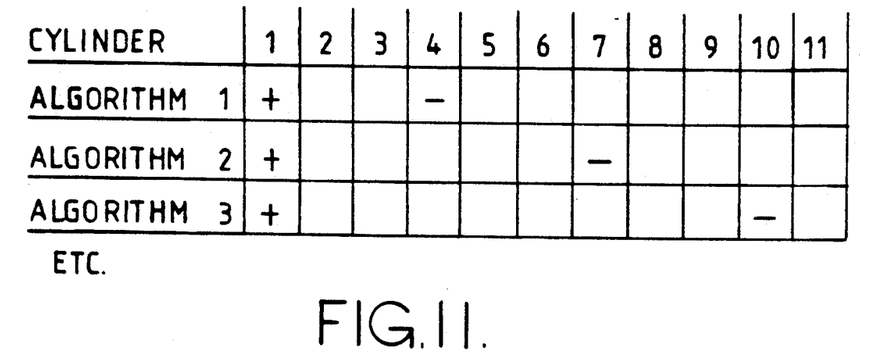
FIGS. 11 to 13 are tables illustrating the derivation of misfire detection technique for the operation illustrated in FIG. 10.
Figure 12:
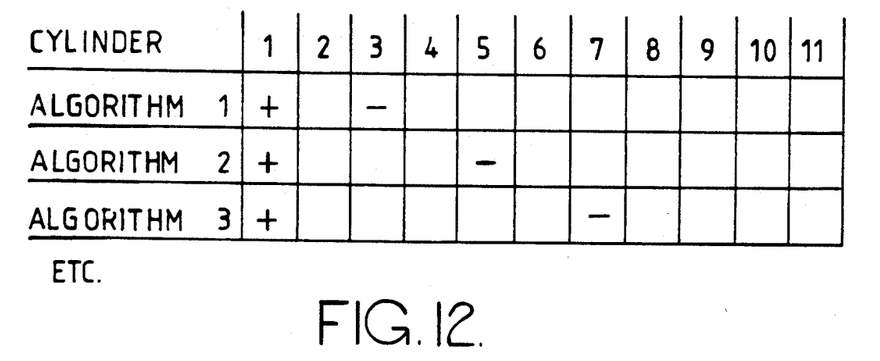
Figure 13:
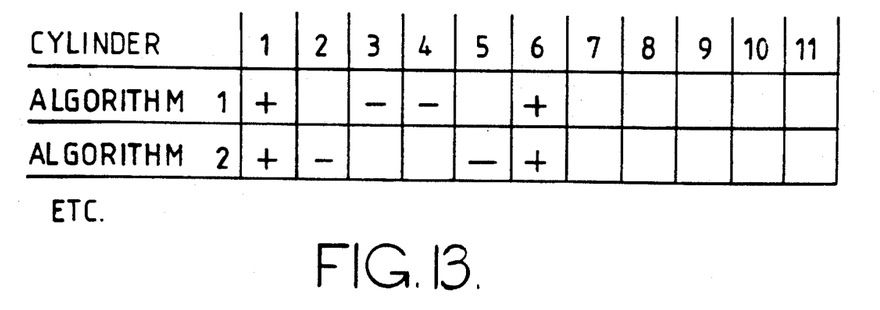

FIGS. 11 to 13 are tables illustrating the derivation of the calculation performed in the step 231 of FIG. 10. Thus, in order to avoid tooth spacing errors caused by tolerances in machining the teeth of the disc 10, fire periods are compared by making measurements over the same physical portion of the disc 10. For the six cylinder engine being considered, the measurements which are compared should be located at every third fire cycle or an integer multiple of this.

For an internal combustion engine which exhibits crankshaft vibrations at integer multiples of half the firing frequency, the algorithms shown in FIG. 12 may be employed. Thus, every second fire period, or integer multiple of this, is used for comparison.

In order to compensate for linear accelerations and decelerations of the engine crankshaft lasting at least one engine cycle, the algorithms shown in FIG. 13 may be employed.

In FIGS. 11 to 13, it should be noted that the cylinder number do not refer to the conventional location of cylinders starting at the front of the engine but instead refer to the cylinders in the order in which they are fired within an engine cycle. The "plus sign" and "minus sign" shown in these drawings indicate the ways in which the engine speed or fire periods are combined in order to provide speed difference signals. Thus, in the case of algorithm 1 shown in FIG. 11, the difference is formed between the speed corresponding to the fire period of the cylinder which is performing its ignition stroke and the cylinder which performed its ignition stroke three firing cycles earlier.

Figure 14:
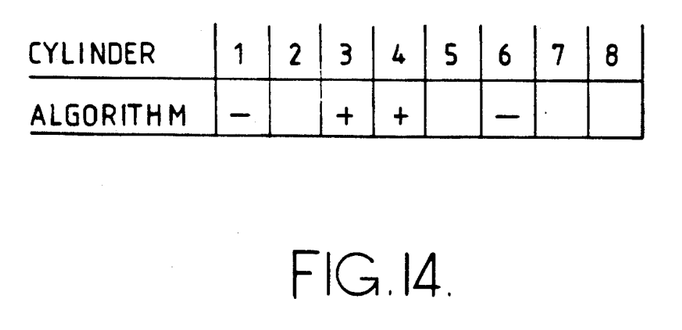
FIGS. 14 to 16 are tables illustrating the misfire detection technique applied to engines having different numbers of cylinders.
Figure 15:
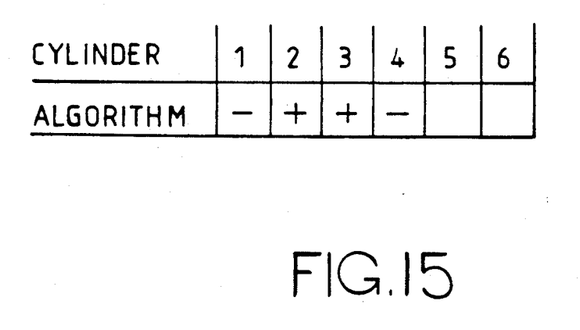
Figure 16:
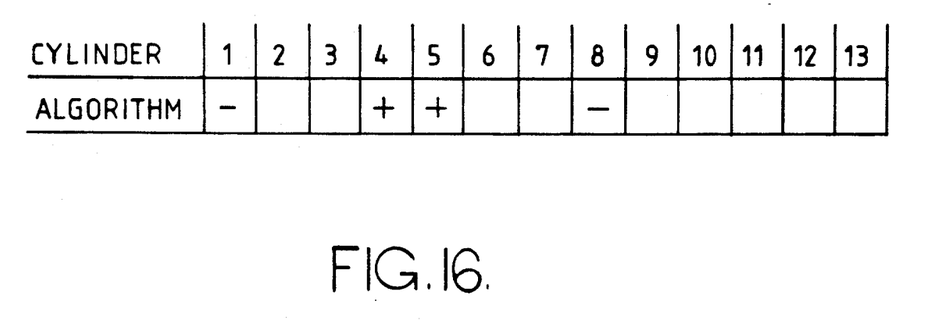

FIGS. 14 to 16 illustrate examples of the actual algorithms which may be used in the step 231 for different engine sizes. FIG. 14 illustrates the present case for a six cylinder in line engine. FIG. 15 illustrates the corresponding algorithm for a four cylinder engine and FIG. 16 illustrates the algorithm for an eight cylinder engine. Suitable algorithms for other types of engines can readily be obtained. Thus, the algorithms shown in FIGS. 14 to 16 represent composites of the techniques illustrated in FIGS. 11 to 13. In other words, the algorithm of FIG. 14 represents a composite of the algorithms shown in FIGS. 11 to 13.

A composite algorithm which fully combines the algorithms shown in FIGS. 11 to 13 can be provided for any engine having an even number of cylinders. For an engine with an odd number of cylinders, this is not possible and an algorithm has to be provided representing any two of the three types of algorithms illustrated in FIGS. 11 to 13. The actual choice of which two algorithms should be combined depends on circumstances and, in particular, which of the three difficulties overcome by the algorithms of FIGS. 11 to 13 is least important for the particular application. For instance, if the engine does not exhibit crankshaft vibrations for alternate firing periods, algorithms from FIGS. 11 and 13 may be combined as a composite algorithm for an engine with an odd number of cylinders.

Figure 17:
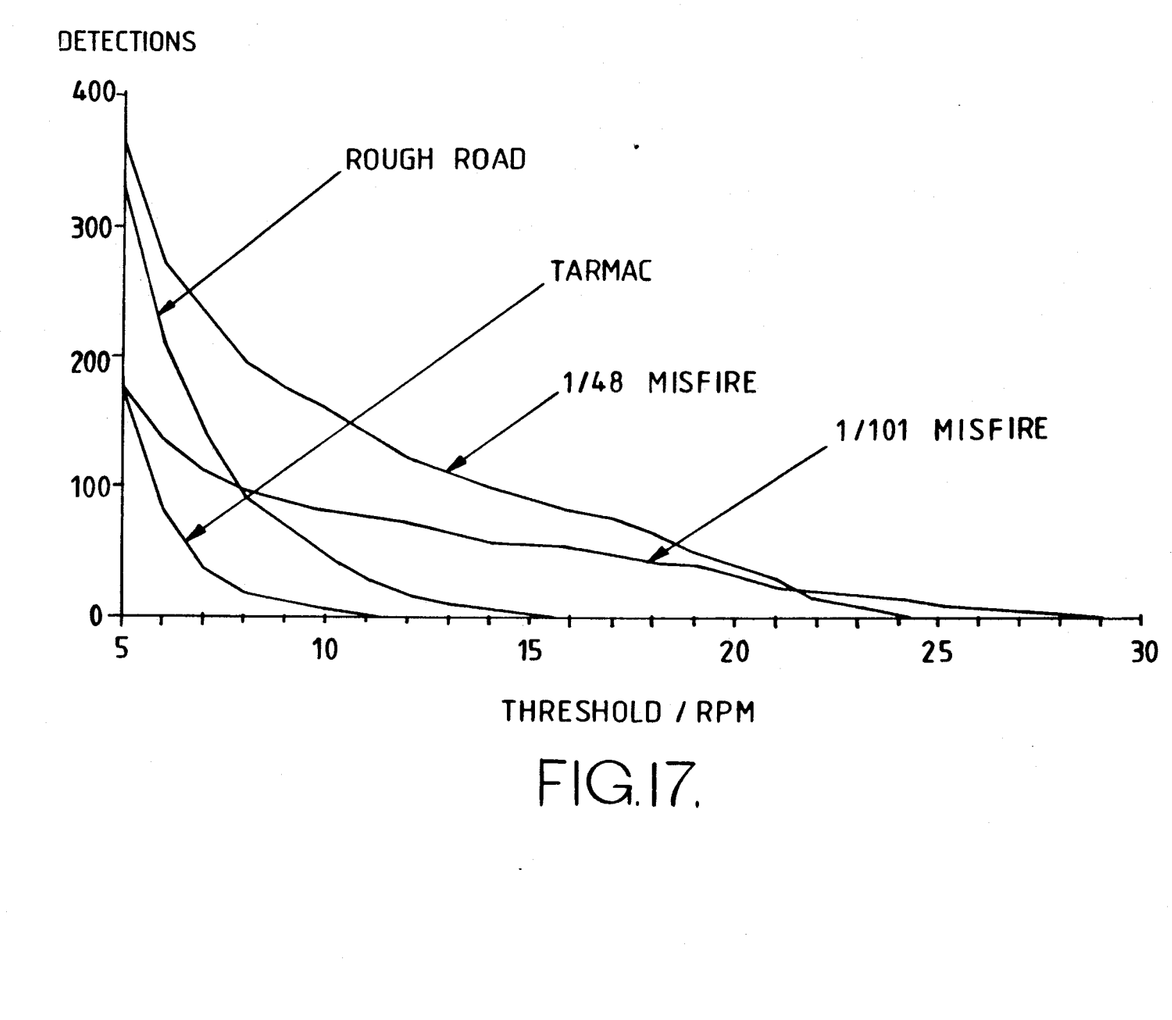
FIG. 17 is a graph of misfire detections against detection threshold for an engine speed of 2,000 RPM.

FIG. 17 illustrates the effect of selecting the threshold against which the speed change signal is compared in the step 235 of FIG. 10. In particular, the vertical axis represents the numbers of misfire detections and the horizontal axis represents the threshold in terms of revolutions per minute (RPM). The curves were obtained for an engine running at 2,000 RPM for a period corresponding to 4,000 engine fire cycles. Thus, the curve labelled "Tarmac" indicates operation of an engine running along a smooth tarmac road with no misfires. From this, it can be seen that thresholds less than about 11 RPM will give rise to spurious misfire detections. The curve labelled "Rough Road" represents a vehicle running along a relatively rough surface, and illustrates that spurious misfire detections will take place below a threshold of about 16 RPM. The curve labelled "1/101 Misfire" represents the occurrence of one actual misfire per 101 fire cycles, and the curve "1/48 Misfire" likewise relates to one misfire per 48 firing cycles. From these curves, it can be seen that a threshold level of 18 RPM will detect approximately the correct number of misfires and will not detect many, if any, spurious misfires. Above a threshold level of about 20 RPM, substantial numbers of misfires are not detected. Thus, the optimum threshold level for the arrangement which gave rise to the results shown in FIG. 17 is 18 or 19 RPM.

It has been found that, following an actual misfire in a cylinder, the succeeding strokes are also affected. This is because of the discrete sampling nature of the period measurements and because the speed remains low for several fires following a misfire. During these fire periods, a speed change above the threshold level may still be registered as a spurious signal.

Although appropriate selection of the threshold level can reduce this spurious misfire detection, the threshold level should not be reduced to the point where spurious detections not associated with actual misfires occur. Thus, a threshold level below about 15 RPM would give rise to such spurious detection, for instance caused by movement over a rough road surface. It may therefore be more appropriate to set the threshold level at 15 or 16 RPM in order to avoid detecting an significant number of spurious misfires while ensuring that all actual misfires are detected.

Figure 18:
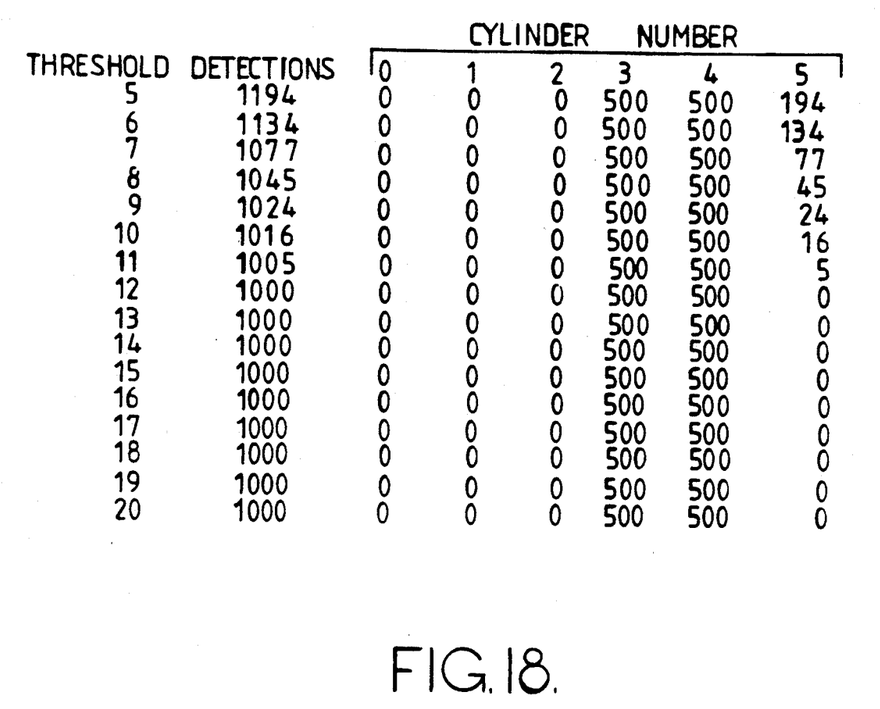
FIG. 18 is a table illustrating consecutive detections of misfires with one cylinder continuously misfiring.

It has been found that detection of consecutive misfires can be used to identify a misfiring cylinder. In particular, FIG. 18 illustrates the results of a test on an engine during which 500 actual misfires took place. The first column indicates different threshold levels and the second column indicates the total number of misfire detections. The remaining columns indicate the total number of misfires detected for each cylinder. Thus, for threshold levels below 12 RPM, misfires were detected for cylinders numbers 3, 4, and 5. Above this threshold, misfires were detected in cylinders 3 and 4 only. In fact, the same numbers of misfires were detected in these two cylinders, and occurred as pairs of misfires during consecutive combustion events. In fact, only cylinder 3 was subjecting to misfiring.

Figure 19:
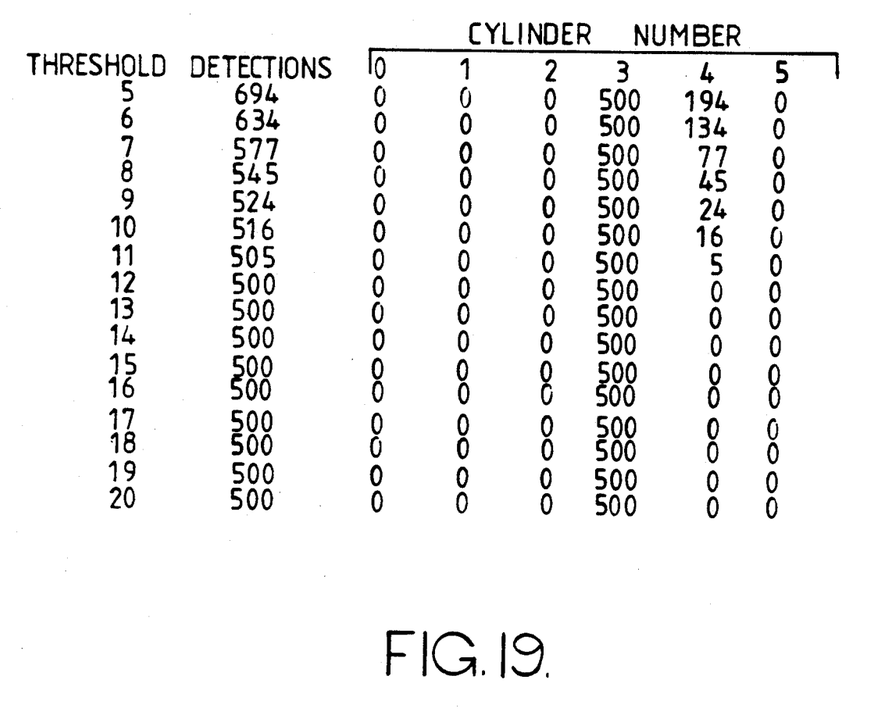
FIG. 19 is a table illustrating identification of a misfiring cylinder based on the detected misfires illustrated in FIG. 18.

Thus, it is possible to identify which cylinder was actually misfiring when misfires occur as consecutive pairs. In order to identify the misfiring cylinder, an algorithm which may be added to the flow diagram of FIG. 10 searches for consecutive misfire detections and then ascribes the misfire to the first of the two cylinders involved in the combustion events. Thus, if a misfire is detected in cylinder firing cycle i and again cylinder firing cycle (i+1), then the algorithm determines that the misfire was actually detected in respect of cylinder i. If consecutive misfires occur for more than two consecutive firing cycles, the above algorithm operates on the first and second such misfire detections, and then on the second and third misfire detections, and so on for any succeeding misfires. This is illustrated in FIG. 19, which shows the effects of applying this algorithm to the data shown in FIG. 18. Thus, the misfiring has correctly been attributed to cylinder number 3 and, for triplets of misfire detections with the threshold level set too low, the additional misfires have been ascribed to cylinder number 4. When the threshold level is set to a more appropriate level, for instance 15 RPM, all of the spurious misfires are eliminated from the data and only those associated with the misfiring cylinder number 3 are identified. Thus, spurious detection of misfiring can be reduced or eliminated and the misfiring cylinder can be identified.

Detection of misfires may be used in various ways. For instance, the engine management system 20 may be alerted to the misfires and may be arranged to take, or attempt to take, remedial action, such as changing the air/fuel ratio or ignition timing or, for a persistently misfiring cylinder, cutting off the supply of fuel to that cylinder. A visual and/or audible indication may be given to a driver of a vehicle so as to alert the driver to a possible problem. Misfires may be recorded in a memory within the engine management system 20 and may be made accessible to service personnel so as to permit efficient and possibly early diagnosis of potential problems in engine operation.

It is thus possible to provide reliable detection of engine misfire by means which can be easily provided at very low cost, for instance requiring no more than additions to software within an engine management system. By giving an indication of possible problems or faults resulting in misfire and/or by taking immediate remedial action, exhaust pollution by unburnt or partially burnt hydrocarbons can be significantly reduced. This is particularly desirable for vehicles fitted with catalytic exhaust gas converters, as the presence of such hydrocarbons in the exhaust gas can degrade or "poison" the catalyst within the converter. Where legislation is enacted requiring automatic diagnostic checks to be made, it is possible to provide this information without substantial modification to, for instance, existing engine management systems.

We claim:

1. An apparatus for detecting misfire in an internal combustion engine having a plurality of pistons and cylinders, said apparatus comprising:
   measuring means for making measurements representing engine speeds between a same first point and a same second point of each cycle of each of the plurality of pistons and cylinders.
   determining means responsive to said measuring means for determining variations by comparing each xth, (x+1)th, (x+a)th, and (x+a+1)th of the measurements, where a is a product of an integer greater than zero and a number of combustion events per revolution of an output shaft of the engine, the xth and (x+a)th measurements have opposite signs in comparison, and the (x+1)th and (x+a+1)th measurements have opposite signs in the comparison; and
   a comparator responsive to said determining means for comparing the variations with a threshold level and for signalling a misfire when the threshold level is exceeded.

2. An apparatus as claimed in claim 1, in which said determining means forms each of the variations as:

$$T(x)-T(x+1)-T(x+a)+T(x+a+1)$$

where T(i) is the ith measurement.

3. An apparatus for detecting misfire in an n cylinder internal combustion engine, where n is an integer greater than 1, said apparatus comprising:
   measuring mean for making measurements representing engine speeds between a same first point and a same second point of each cycle of each of the cylinders;
   determining means responsive to said measuring means for determining variations as a difference between sums $(T(x)+T(x+n-1))$ and $(T(y)+T(z))$, where T(x) is an xth measurement, $T(x+n-1)$ is a $(x+n-1)$th measurement, and T(y) and T(z) are measurements between the xth and $(x+n-1)$th measurements; and
   the comparator responsive to said determining means for comparing the variations with a threshold level and for signalling a misfire when the threshold level is exceeded.

4. An apparatus as claimed in claim 3, in which said measurements T(y) and T(z) are midway between the xth and (x+n−1)th measurements.

5. An apparatus as claimed in claim 4 for a four-stroke cycle engine having an even number of cylinders, in which the measurements T(y) and T(z) are (x+(n/2)−1)th and (x+(n/2))th measurements.

6. An apparatus as claimed in claim 4 for a four-stroke cycle engine having an odd number of cylinders, in which the measurement T(y) is the (x+((n−1)/2))th measurement and the measurement T(z) is one of a set comprising (x+((n−1)/2)−1)th, (x+((n−1)/2))th, and (x+((n−1)/2)+1)th measurements.

* * * * *